United States Patent [19]

Crownover

[11] 4,311,455

[45] Jan. 19, 1982

[54] THERMAL ADJUSTMENT OF DIELECTRIC CONSTANT OF HOT-PRESSED CERAMIC CAPACITORS

[75] Inventor: Joseph W. Crownover, La Jolla, Calif.

[73] Assignee: Statnetics Laboratories Corp., San Diego, Calif.

[21] Appl. No.: 183,303

[22] Filed: Sep. 2, 1980

[51] Int. Cl.³ .......................... F26B 9/12; F27B 14/00
[52] U.S. Cl. ..................................................... 432/18
[58] Field of Search ................... 432/13, 18; 252/520; 106/73.31

[56] References Cited

U.S. PATENT DOCUMENTS 3,600,484  8/1971  Smoke et al. ................... 106/73.31
4,058,404 11/1977  Fujiwara et al. ................ 106/73.31
4,122,292 10/1978  Karinsky ............................. 13/2 P

OTHER PUBLICATIONS

"Gas Isostatic Hot Pressing without Molds", vol. 54, No. 2 (1975), pp. 201–207
"Properties of Hot-Pressed Barium Titanate", USASRDL Tech. Report 2196.

Primary Examiner—John J. Camby
Attorney, Agent, or Firm—William W. Haefliger

[57] ABSTRACT

A method of achieving close control of the electrical capacitance of a ceramic capacitor body the dielectric constant of which has been substantially increased by subjecting the capacitor body to sintering temperature and simultaneous relatively high pressurization, includes, (a) subjecting the capacitor body to elevated temperature, (b) and maintaining the body at elevated temperature while simultaneously maintaining the body at relatively low pressurization, for a time interval until the dielectric constant of the body has been reduced to desired level.

12 Claims, 4 Drawing Figures

THERMAL ADJUSTMENT OF DIELECTRIC CONSTANT OF HOT-PRESSED CERAMIC CAPACITORS

BACKGROUND OF THE INVENTION

This invention relates generally to the manufacture of ceramic capacitors, and more particularly concerns the adjustment of dielectric constants of capacitors to desired levels.

The dielectric constants of ceramic materials, such as $BaTiO_3$ for example, is greatly increased by the technique of so called hot-press sintering. See for example "Gas Isostatic Hot Pressing Without Molds" by K. H. Hardtl published in Vol. 54, No. 2 (1975) of Ceramic Bulletin, Am. Ceramic Society; see also "Properties of Hot-Pressed Barium Titanate" by Arthur Brown and Robert Fischer, published in USASRDL Technical Report 2196 for April 1961. The hot pressing effect is facilitated by high isostatic gas pressure on the order of 50 to 100 atmospheres at elevated sintering temperature. Thus, hot-pressed $BaTiO_3$ typically exhibits a dielectric constant in excess of 3000 as compared with conventionally sintered $BaTiO_3$ exhibiting a dielectric constant of about 1000.

There remains a need, however, to provide accurate and controlled, high dielectric constants in such hot-pressed ceramic materials, as for example at dielectric constant levels less than 3000.

SUMMARY OF THE INVENTION

It is a major object of the invention to provide a process by which such accurate and controlled dielectric constants can be achieved, in hot-pressed ceramic capacitors or capacitor materials. In particular, it is an object of the invention to provide a means of "tuning" hot-pressed ceramic capacitor materials to achieve controlled changes in dielectric constant so as to derive capacitance changes on the order of 1%, 2%, 5% or 10%. Basically, these objectives are met by:

(a) subjecting the previously hot-pressed ceramic body or material to elevated temperature, typically carefully chosen to be somewhat less than the prior sintering temperature, and (b) maintaining the body at such elevated temperature or temperatures while simultaneously maintaining the body at relatively low pressurization, for a time interval until the dielectric constant of the body has been reduced to desired level.

As will appear, the relatively low pressurization is substantially no greater than one atmosphere; the elevated treating temperature may be between 800° C. and 1,200° C.; the treating time may be between 1 minute and 30 minutes; and the capacitor ceramic is typically $BaTiO_3$, although other ceramics may be used.

Further, a kiln treatment apparatus, or laser beam apparatus may be employed to produce the elevated temperature.

These and other objects and advantages of the invention, as well as the details of an illustrative embodiment, will be more fully understood from the following description and drawings in which:

DRAWING DESCRIPTION

DETAILED DESCRIPTION

Figure 1:
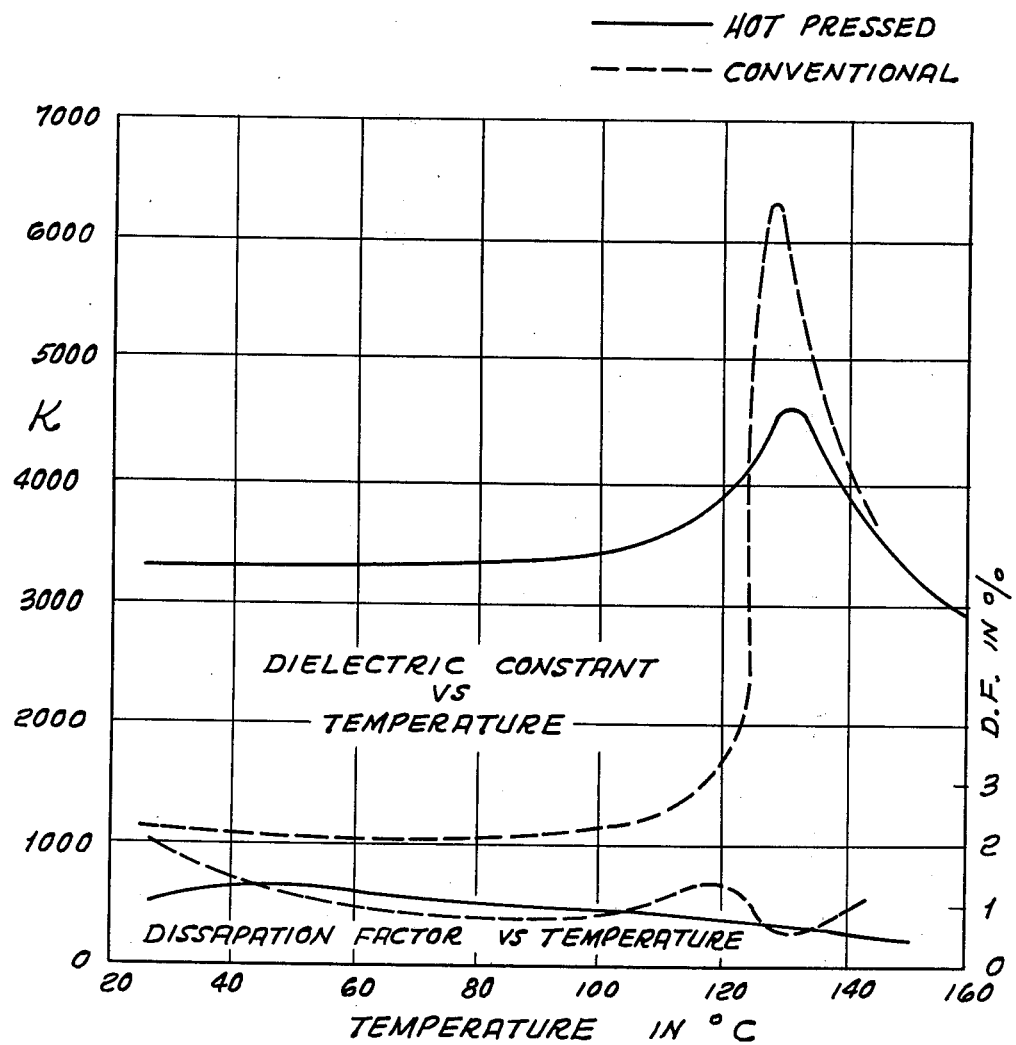
FIG. 1 is a graph showing differences in dielectric constants of hot-pressed and conventionally sintered capacitors.

Referring first to the FIG. 1 graph, it shows typical dielectric constant temperature curves for hot-pressed ceramic capacitors and for conventionally sintered capacitors. The hot-pressed capacitors clearly have superior dielectric constant characteristics, at least over the temperature range 20° C.–120° C. Thus, hot-pressed ceramic capacitors typically exhibit dielectric constants in excess of 3000, whereas conventionally sintered ceramic capacitors exhibit dielectric constants of about 1000.

In accordance with the present invention, the dielectric constants of ceramic capacitor bodies or samples, which have been increased by sintering and by simultaneously pressurization, are reduced to controlled or accurately "tuned" level. This is effected by:

(a) subjecting the capacitor body to elevated temperature, (b) and maintaining the body at said elevated temperature while simultaneously maintaining the body at relatively low pressurization, for a time interval until the dielectric constant of the body has been reduced to desired level.

Typically, the elevated temperature to which the "hot-pressed" capacitor bodies are again raised is no greater than the prior sintering temperature level; and the relatively low pressurization level is substantially no greater than one atmosphere. For example, for best results, in the case of $BaTiO_3$ capacitor bodies, the elevated temperature is between about 800° C. and about 1,200° C. Further, the time interval during which the capacitor body is held at elevated temperature is between about one minute and 30 minutes.

Figure 2:
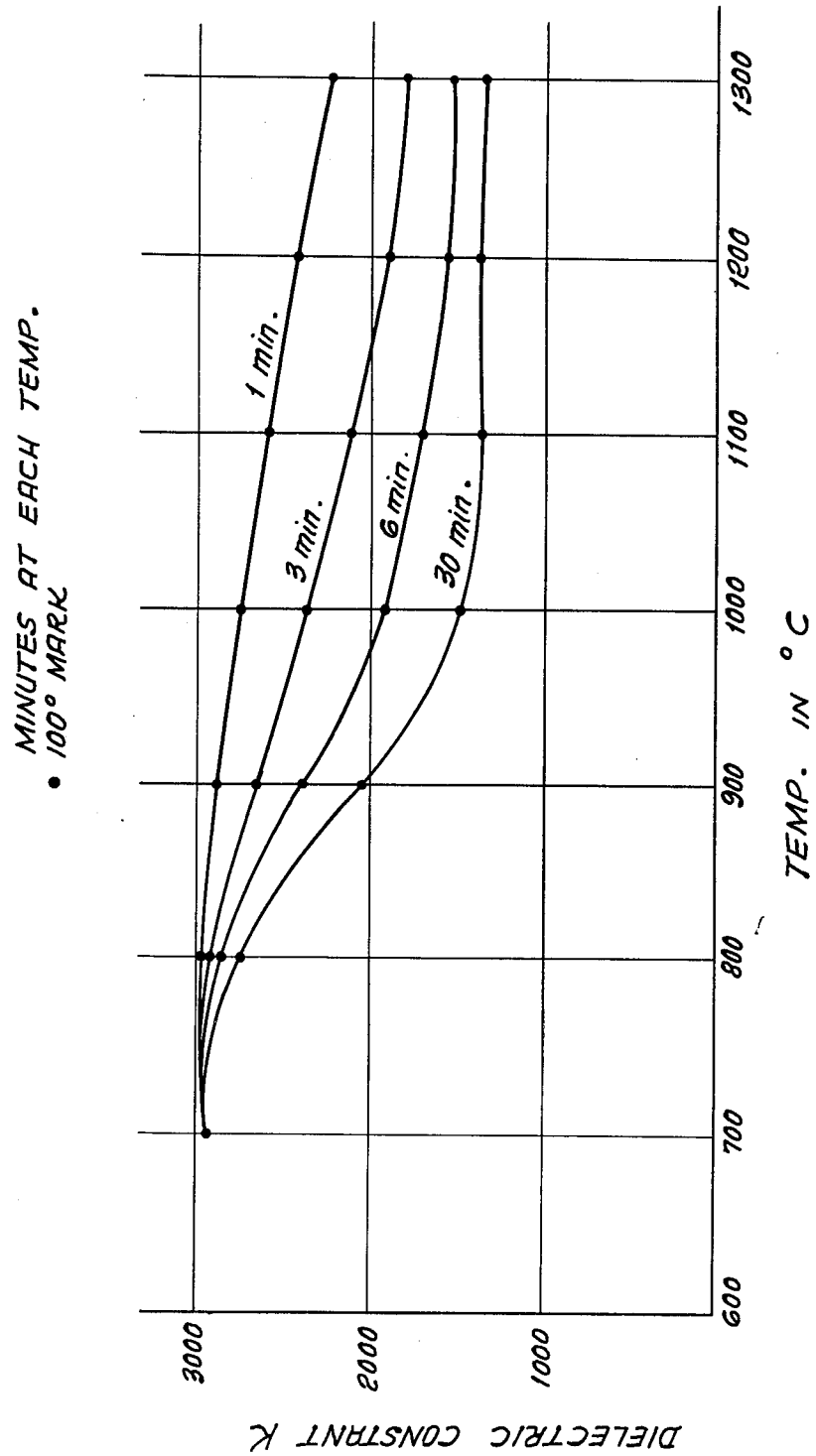
FIG. 2 is a graph showing controlled reduction in dielectric constant at varying temperature levels and time intervals.

FIG. 2 shows a family of curves of dielectric constant K versus temperature, for various time intervals, the capacitor bodies being hot-pressed $BaTiO_3$. It will be noted that when a capacitor body is subjected to 1,000° C. for 30 minutes, the dielectric constant K drops from about 3000 to 1,420; and if the capacitor body is subjected to 1000° C. for only one minute, the K value drops to 2,710, i.e. the drop is about 10%.

Further, if the capacitor body is subjected to 900° C. for one minute, the K value drops to about 2,900, a drop of about 100 in K value. Accordingly, capacitors having K value 100 too high may be fine tuned by treatment at 900° C. for one minute. The fine tuning regions of the curves lie between about 800° C. and 1200° C., and between about 1 minute and 30 minutes.

Figure 3:
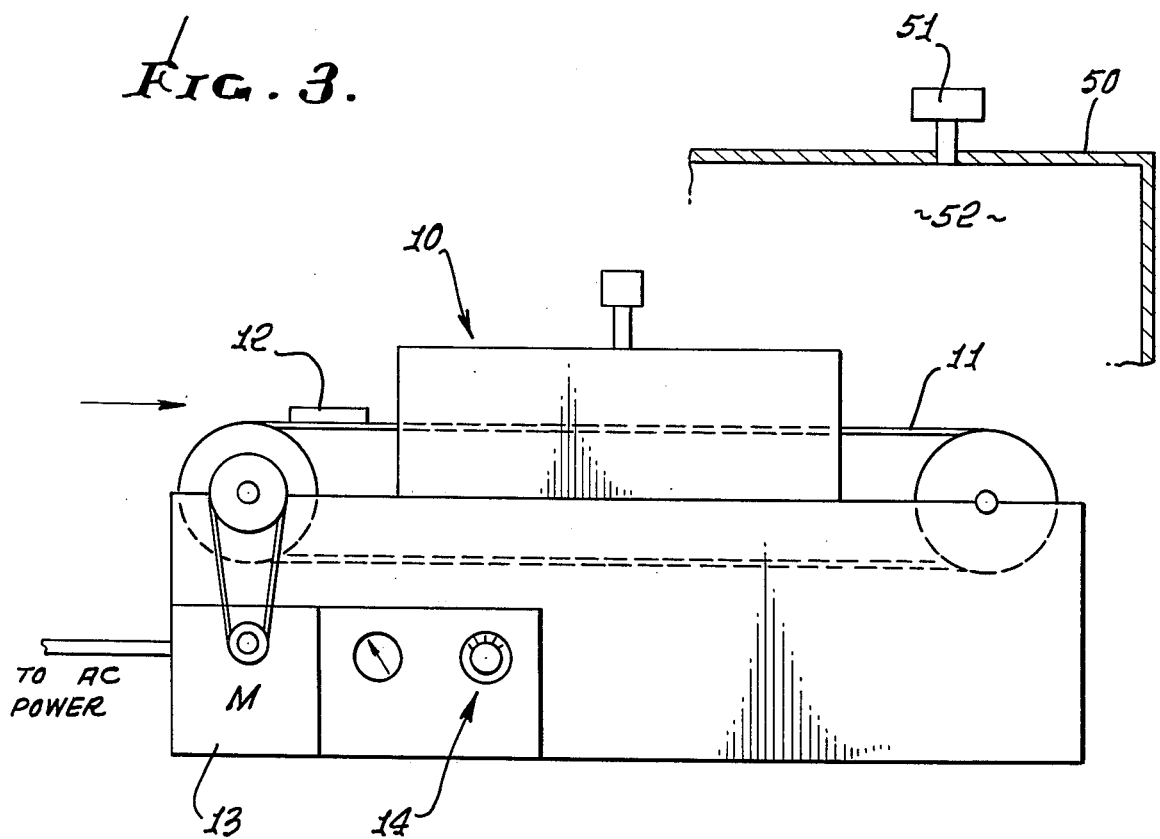
FIG. 3 is an elevational view of kiln apparatus for treating the capacitors.

FIG. 3 shows the use of kiln 10 and a belt conveyor 11 on which ceramic capacitor bodies 12 are conveyed through the kiln. The motor 13 to drive the conveyor is controlled at 14 so that the duration of ceramic body stay or travel in the kiln at elevated temperature is controlled to fine tune the reduction in K levels of the bodies to selected level. As an example, up to 50,000 small ceramic bodies may be travelled through the kiln at one time.

Figure 4:
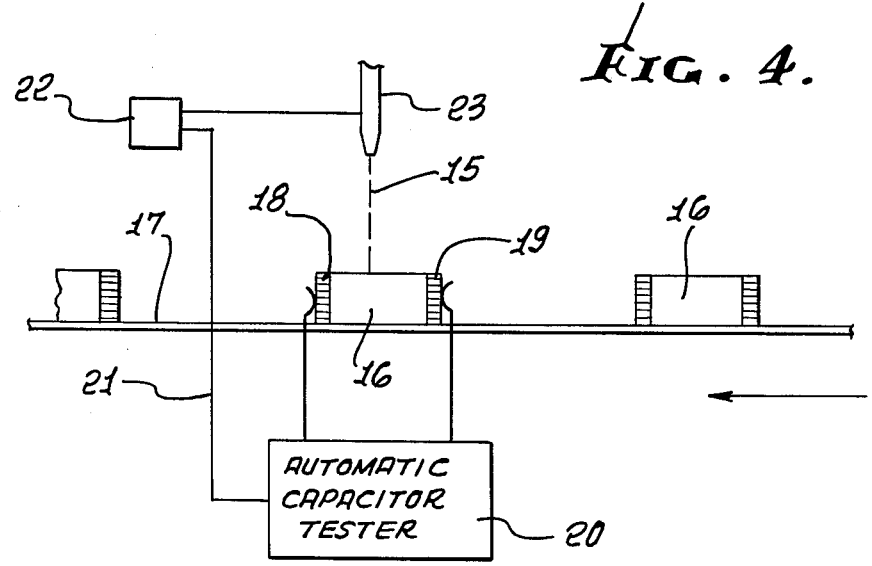
FIG. 4 is an elevational view of laser beam apparatus for treating the capacitors.

FIG. 4 shows a laser beam 15 impinging on a ceramic capacitor body or chip 16 to heat the chip to required level, as the body travels on a moving conveyer 17. Test terminals 18 and 19 on the chip are connected to an automatic capacitor tester 20 which continuously measures the K or capacitance of the body or capacitor. When that level has dropped to desired threshold level, the tester 20 turns off the laser beam, as via connection 21 to the laser beam control 22 for beam generator or source 23.

In each of FIGS. 3 and 4, the pressure may be controlled in the heating environment, i.e. to a low relative pressure other than one atmosphere, as by locating the apparatus in a pressure vessel 50 (see FIG. 3) and employing a pressure control 51. For example, the gas (such as air) pressure in the vessel interior 52 may be between ½ and 3 atmospheres.

EXAMPLE 1

A $BaTiO_3$ sample body, hot-pressed previously as described in the article, "Properties of Hot-Pressed Barium Titanate" by Arthur Brown and Robert Fischer, USASRDL Technical Report 2196, for April, 1961, was treated in a kiln at 900° C. for one minute and at 1 atmosphere pressure. Its K value vas thereby reduced to 2710.

EXAMPLE 2

A $BaTiO_3$ sample body, hot-pressed as described in Example 1, was treated in a kiln at 1,000° C. for 30 minutes and at 1 atmosphere pressure. Its K value was thereby reduced to 1,420.

EXAMPLE 3

A $BaTiO_3$ sample body, hot-pressed as described in Example 1, was treated in a kiln at 1,000° C. for 1 minute and at 1 atmosphere pressure. Its K value was thereby reduced to 2,710.

I claim:

1. The method of achieving close control of the electrical capacitance of a hot pressed, finished ceramic capacitor body the dielectric constant of which has previously been substantially increased by subjecting the capacitor body to sintering temperature and simultaneous relatively high pressurization, that includes,
   (a) subjecting the finished capacitor body to elevated temperature
   (b) and reducing the dielectric constant of the body to pre-selected level by maintaining said body at said elevated temperature while simultaneously maintaining the body at relatively low pressurization, for a time interval until the dielectric constant drops to said level.
2. The method of claim 1 wherein said elevated temperature is no greater than said sintering temperature.
3. The method of claim 1 wherein said relatively low pressurization is substantially no greater than one atmosphere.
4. The method of claim 1 wherein said elevated temperature is between about 800° C. and about 1,200° C.
5. The method of claim 4 wherein said time interval is between about one minute and about 30 minutes.
6. The method of claim 1 wherein said capacitor body consists of $BaTiO_3$.
7. The method of claim 1 wherein a kiln is employed and said (b) step of maintaining the capacitor at said elevated temperature is carried out by locating the capacitor body in said kiln for said time interval.
8. The method of claim 1 wherein a laser beam is employed, and said (b) step of maintaining the capacitor at said elevated temperature is carried out by locating the capacitor body in the path of said beam for said time interval.
9. The method of claim 1 wherein multiple capacitor bodies are simultaneously treated, as defined.
10. The product produced by the method of claim 1.
11. The method of claim 8 including measuring the dielectric constant of the body as said constant drops, and terminating said laser beam path when said preselected dielectric constant, as measured, is achieved.
12. The method of achieving close control of the electrical capacitance of a hot pressed, finished ceramic capacitor body the dielectric constant of which has previously been substantially increased by subjecting the capacitor body to sintering temperature and simultaneous relatively high pressurization, that includes,
    (a) subjecting the finished capacitor body to elevated temperature,
    (b) and reducing the dielectric constant of the body to pre-selected level by maintaining said body at said elevated temperature while simultaneously maintaining the body at relatively low pressurization, for a time interval until the dielectric constant drops to said level of the body,
    (c) said elevated temperature being between 800° C. and 1,200° C., said low pressurization being no greater than about one atmosphere, said time interval being between one minute and 30 minutes, and said dielectric constant being reduced from said increased level which is no less than about 3,000.

* * * * *